(12) United States Patent
Ukita et al.

(10) Patent No.: US 7,907,285 B2
(45) Date of Patent: Mar. 15, 2011

(54) SCATTERED LIGHT MEASURING DEVICE (75) Inventors: Junichi Ukita, Saitama (JP); Takashi Matsumura, Saitama (JP)

(73) Assignee: Advantest Corporation, Tokyo (JP)

( * ) Notice: Subject to any disclaimer, the term of this patent is extended or adjusted under 35 U.S.C. 154(b) by 355 days.

(21) Appl. No.: 12/088,737

(22) PCT Filed: Sep. 27, 2006

(86) PCT No.: PCT/JP2006/319820
§ 371 (c)(1),
(2), (4) Date: May 22, 2008

(87) PCT Pub. No.: WO2007/043402
PCT Pub. Date: Apr. 19, 2007

(65) Prior Publication Data
US 2009/0273775 A1 Nov. 5, 2009

(30) Foreign Application Priority Data
Oct. 3, 2005 (JP) ................................ 2005-290543

(51) Int. Cl.
G01B 9/02 (2006.01)
G01N 21/00 (2006.01)
(52) U.S. Cl. ...................................... 356/485; 356/73.1
(58) Field of Classification Search .............. 356/73.1, 356/485
See application file for complete search history.

(56) References Cited

U.S. PATENT DOCUMENTS
4,794,249 A * 12/1988 Beckmann et al. ...... 250/227.23
5,598,289 A * 1/1997 Watanabe .................... 398/177
5,798,853 A * 8/1998 Watanabe .................... 398/150
6,700,655 B2 * 3/2004 Uchiyama et al. .......... 356/73.1
2007/0159621 A1 * 7/2007 Ukita ........................... 356/73.1
2007/0171401 A1 * 7/2007 Ukita ........................... 356/73.1
(Continued)

FOREIGN PATENT DOCUMENTS
JP 2-166426 6/1990
(Continued)

OTHER PUBLICATIONS
English language Abstract of JP 2002-323407.
(Continued)

*Primary Examiner* — Patrick J Connolly
(74) *Attorney, Agent, or Firm* — Greenblum & Bernstein P.L.C.

(57) ABSTRACT

Measurement of Brillouin scattered light is enabled without an optical receiver having a wide reception band. A scattered light measuring device includes a continuous wave light source that generates continuous wave light, an optical pulse generator that converts the continuous wave light into pulsed light, an optical frequency shifter that receives the continuous wave light, and outputs shifted light including the continuous wave light, first sideband light having an optical frequency higher than an optical frequency F0 of the continuous wave light by a predetermined optical frequency Flo, and second sideband light having an optical frequency lower than the optical frequency F0 of the continuous wave light by the predetermined optical frequency Flo, a power reducing unit that reduces the power of the continuous wave light in the shifted light output by said optical frequency shifter, and a heterodyne optical receiver that receives scattered light from an incident end of an optical fiber which the pulsed light enters, further receives the shifted light from said optical frequency shifter, and outputs an electric signal having a frequency which is a difference between the optical frequency of the scattered light and the optical frequency of the shifted light.

9 Claims, 9 Drawing Sheets

U.S. PATENT DOCUMENTS

2009/0273775 A1 * 11/2009 Ukira et al. .................. 356/73.1
2010/0165327 A1 * 7/2010 Hartog ........................ 356/73.1

FOREIGN PATENT DOCUMENTS

| | | | |
|---|---|---|---|
| JP | 7-11649 | | 2/1995 |
| JP | 09-229820 | * | 9/1997 |
| JP | 9-229820 | | 9/1997 |
| JP | 2001-165808 | | 6/2001 |
| JP | 2002-323407 | | 11/2002 |
| JP | 2003-139651 | * | 5/2003 |

OTHER PUBLICATIONS

English language Abstract of JP 9-229820.
English language Abstract of JP 2003-139651.
English language Abstract of JP 2-166426.
English language Abstract of JP 2001-165808.

* cited by examiner

SCATTERED LIGHT MEASURING DEVICE

TECHNICAL FIELD

The present invention relates to a measurement of Brillouin scattered light.

BACKGROUND ART

Conventionally, Brillouin scattered light has been coherently detected by supplying an optical fiber with pulsed light generated by pulsing continuous waveform light to acquire scattered light from the optical fiber (refer to FIG. 8 of Japanese Laid-Open Patent Publication No. 2001-165808). The coherent detection is carried out by multiplexing the scattered light and intensity—modulated light obtained by modulating the continuous waveform light (optical frequency: fc) by an intensity modulation at a predetermined frequency p, for example. It should be noted that scattered light include Rayleigh scattered light (optical frequency: fc) in addition to the Brillouin scattered light (optical frequencies: fc+fb and fc−fb). Moreover, it should be noted that the intensity—modulated light includes a carrier light component having the optical frequency fc, and sideband light components having the optical frequencies fc+p and fc−p. Moreover, the coherent detection is carried out by an optical receiver including a photo diode.

However, according to the above prior art technology, a result of the coherent detection includes a result of the detection of the Rayleigh scattered light (center frequency: 0) in addition to a result of the detection of the Brillouin scattered light (center frequency: |p−fb|). In general, the power of the detection result of the Rayleigh scattered light is larger than the power of the detection result of the Brillouin scattered light. Therefore, if |p−fb| is not sufficiently higher than 0 (zero), the detection result of the Brillouin scattered light will be buried in the detection result of the Rayleigh scattered light, and the Brillouin scattered light thus cannot be measured.

However, if |p−fb| is sufficiently higher than 0, it is necessary to widen the reception band of the photo diode of the optical receiver. A photo diode having a wide reception band is expensive, and the cost for detecting the Brillouin scattered light thus increases.

In view of the foregoing problems, it is an object of the present invention to measure Brillouin scattering light without using an optical receiver having a wide reception band.

DISCLOSURE OF THE INVENTION

According to the present invention, a scattered light measuring device includes: a continuous wave light source that generates continuous wave light; an optical pulse generator that converts the continuous wave light into pulsed light; an optical frequency shifter that receives the continuous wave light, and outputs a shifted light including the continuous wave light, first sideband light having an optical frequency higher than an optical frequency of the continuous wave light by a predetermined optical frequency, and second sideband light having an optical frequency lower than the optical frequency of the continuous wave light by the predetermined optical frequency; a power reducing unit that reduces the power of the continuous wave light in the shifted light output by the optical frequency shifter; and a heterodyne optical receiver that receives scattered light from an incident end of an optical fiber which the pulsed light enters, further receives the shifted light from the optical frequency shifter, and outputs an electric signal having a frequency which is a difference between the optical frequency of the scattered light and the optical frequency of the shifted light.

According to the thus constructed scattered light measuring device, a continuous wave light source generates continuous wave light. An optical pulse generator converts the continuous wave light into pulsed light. An optical frequency shifter receives the continuous wave light, and outputs a shifted light including the continuous wave light, first sideband light having an optical frequency higher than an optical frequency of the continuous wave light by a predetermined optical frequency, and second sideband light having an optical frequency lower than the optical frequency of the continuous wave light by the predetermined optical frequency. A power reducing unit reduces the power of the continuous wave light in the shifted light output by the optical frequency shifter. A heterodyne optical receiver receives scattered light from an incident end of an optical fiber which the pulsed light enters, further receives the shifted light from the optical frequency shifter, and outputs an electric signal having a frequency which is a difference between the optical frequency of the scattered light and the optical frequency of the shifted light.

According to the present invention, a scattered light measuring device includes: a continuous wave light source that generates continuous wave light; an optical pulse generator that converts the continuous wave light into pulsed light; an optical frequency shifter that receives scattered light from an incident end of an optical fiber which the pulsed light enters, and outputs shifted light including the scattered light, first sideband scattered light having an optical frequency higher than an optical frequency of the scattered light by a predetermined optical frequency, and second sideband scattered light having an optical frequency lower than the optical frequency of the scattered light by the predetermined optical frequency; a power reducing unit that reduces the power of the scattered light in the shifted light output by the optical frequency shifter; and a heterodyne optical receiver that receives continuous wave light from the continuous wave light source, further receives the shifted light from the optical frequency shifter, and outputs an electric signal having a frequency which is a difference between the optical frequency of the continuous wave light and the optical frequency of the shifted light.

According to the thus constructed scattered light measuring device, a continuous wave light source generates continuous wave light. An optical pulse generator converts the continuous wave light into pulsed light. An optical frequency shifter receives scattered light from an incident end of an optical fiber which the pulsed light enters, and outputs shifted light including the scattered light, first sideband scattered light having an optical frequency higher than an optical frequency of the scattered light by a predetermined optical frequency, and second sideband scattered light having an optical frequency lower than the optical frequency of the scattered light by the predetermined optical frequency. A power reducing unit reduces the power of the scattered light in the shifted light output by the optical frequency shifter. A heterodyne optical receiver receives continuous wave light from the continuous wave light source, further receives the shifted light from the optical frequency shifter, and outputs an electric signal having a frequency which is a difference between the optical frequency of the continuous wave light and the optical frequency of the shifted light.

According to the present invention, a scattered light measuring device includes: a continuous wave light source that generates continuous wave light; an optical frequency shifter that receives the continuous wave light, and outputs a shifted light including the continuous wave light, first sideband light having an optical frequency higher than an optical frequency of the continuous wave light by a predetermined optical frequency, and second sideband light having an optical frequency lower than the optical frequency of the continuous wave light by the predetermined optical frequency; a power reducing unit that reduces the power of the continuous wave light in the shifted light output by the optical frequency shifter; an optical pulse generator that converts the shifted light into pulsed light; and a heterodyne optical receiver that receives the continuous wave light from the continuous wave light source, further receives scattered light from an incident end of an optical fiber which the pulsed light enters, and outputs an electric signal having a frequency which is a difference between the optical frequency of the continuous wave light and the optical frequency of the shifted light.

According to the thus constructed scattered light measuring device, a continuous wave light source generates continuous wave light. An optical frequency shifter receives the continuous wave light, and outputs a shifted light including the continuous wave light, first sideband light having an optical frequency higher than an optical frequency of the continuous wave light by a predetermined optical frequency, and second sideband light having an optical frequency lower than the optical frequency of the continuous wave light by the predetermined optical frequency. A power reducing unit reduces the power of the continuous wave light in the shifted light output by the optical frequency shifter. An optical pulse generator converts the shifted light into pulsed light. A heterodyne optical receiver receives the continuous wave light from the continuous wave light source, further receives scattered light from an incident end of an optical fiber which the pulsed light enters, and outputs an electric signal having a frequency which is a difference between the optical frequency of the continuous wave light and the optical frequency of the shifted light.

According to the scattered light measuring device of the present invention, the optical frequency shifter may include demultiplexing unit that demultiplexes the received light into two parts of demultiplexed light, a first phase changing unit that changes the phase of one part of the demultiplexed light by a predetermined phase, a second phase changing unit that changes the phase of the other part of the demultiplexed light by a predetermined phase, which is in antiphase with, is thus the same in magnitude as, and is opposite in polarity to the predetermined phase, and a multiplexing unit that multiplexes an output of the first phase changing unit and an output of the second phase changing unit with each other, wherein the power reducing unit may cause the predetermined phase to have a constant component.

According to the scattered light measuring device of the present invention, the power reducing unit may impress a DC voltage the magnitude of which corresponds to the constant component.

BEST MODE FOR CARRYING OUT THE INVENTION

A description will now be given of an embodiment of the present invention with reference to drawings.

First Embodiment

Figure 1:
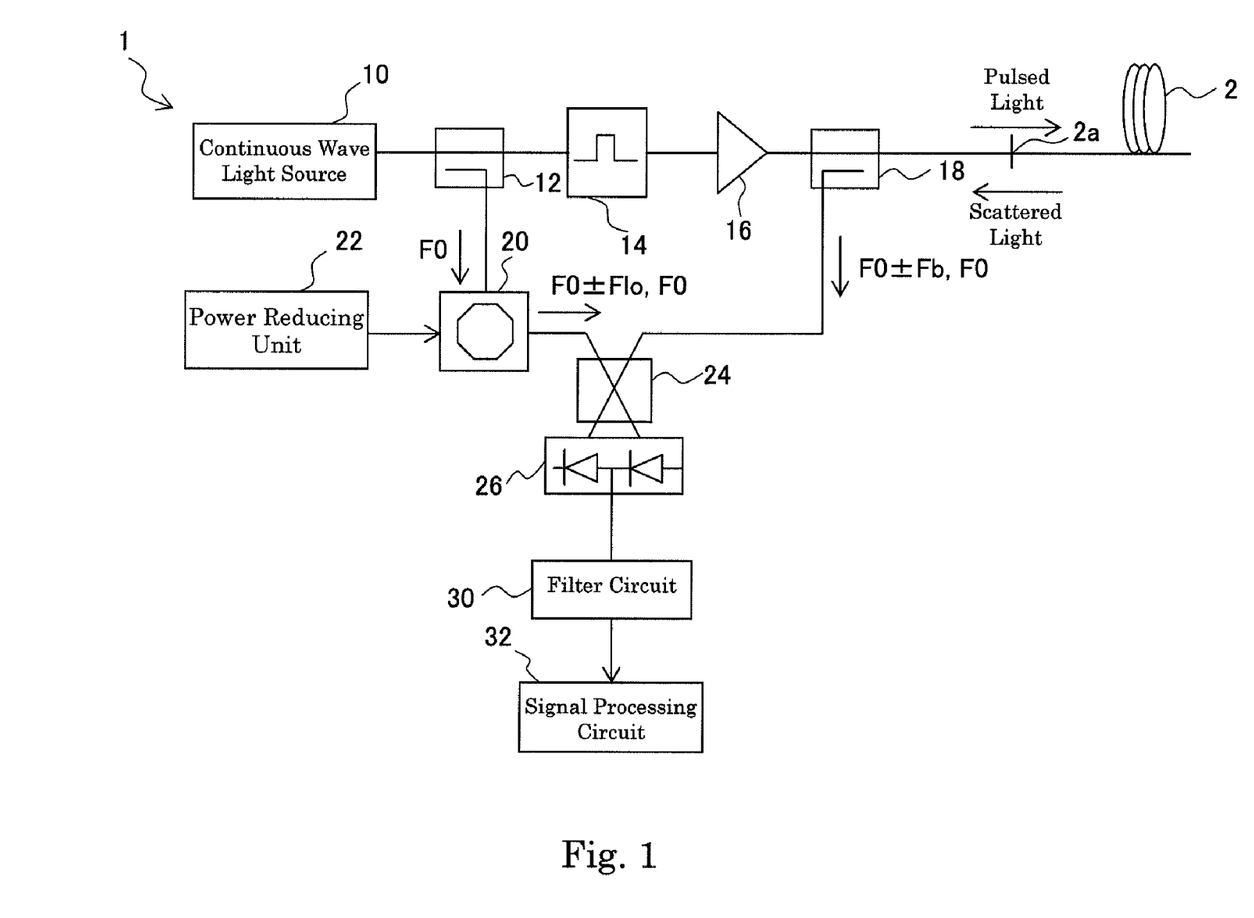
FIG. 1 shows a configuration of a Brillouin scattered light measuring device 1 according to a first embodiment.

FIG. 1 shows a configuration of a Brillouin scattered light measuring device 1 according to a first embodiment. The Brillouin scattered light measuring device 1 is connected to an optical fiber 2. Moreover, the Brillouin scattered light measuring device 1 includes a continuous wave light source 10, an optical coupler 12, an optical pulse generator 14, an optical amplifier 16, an optical coupler 18, an optical frequency shifter 20, a power reducing unit 22, an optical coupler 24, an heterodyne optical receiver 26, a filter circuit 30, and a signal processing circuit 32.

The continuous wave light source 10 generates continuous wave (CW) light. The optical coupler 12 receives the continuous wave light from the continuous wave light source 10, and supplies the optical pulse generator 14 and the optical frequency shifter 20 with the continuous wave light. The optical pulse generator 14 converts the continuous wave light into pulsed light. The optical amplifier 16 amplifies the pulsed light.

The optical coupler 18 receives the pulsed light from the optical amplifier 16, and supplies the optical fiber 2 with the pulsed light via an incident end 2a. Scattered light (Rayleigh scattered light and Brillouin scattered light) is emitted from the incident end 2a of the optical fiber 2, and is fed to the optical coupler 18. The optical coupler 18 supplies the optical coupler 24 with the received scattered light.

The optical frequency shifter 20 receives the continuous wave light from the optical coupler 12. Then, the optical frequency shifter 20 outputs shifted light. It should be noted that the shifted light includes the continuous wave light, first sideband light, and second sideband light. The first sideband light is light having an optical frequency F0+Flo, which is higher than the optical frequency F0 of the continuous wave light by an optical frequency of Flo. The second sideband light is light having an optical frequency F0−Flo, which is lower than the optical frequency F0 of the continuous wave light by the optical frequency of Flo.

The power reducing unit 22 reduces the power of the continuous wave light (optical frequency: F0) in the shifted light output by the optical frequency shifter 20.

FIG. 2(a) and FIG. 2(b) are respectively a plan view and a front view of the optical frequency shifter 20. The optical frequency shifter 20 includes a leading-in unit 20a, a demultiplexing unit 20b, a first phase changing unit 20c, a second phase changing unit 20d, a multiplexing unit 20e, a leading-out unit 20f, an electrode unit 20g, and a substrate 20h. The leading-in unit 20a, the demultiplexing unit 20b, the first phase changing unit 20c, the second phase changing unit 20d, the multiplexing unit 20e, and the leading-out unit 20f are formed on the substrate 20h. The substrate 20h is a substrate made of LiNbO$_3$ crystal, for example, and is not shown in FIG. 2(a).

The power reducing unit 22 includes an AC power supply unit 22a and a DC power supply unit 22b.

The leading-in unit 20a receives the continuous wave light from the optical coupler 12, and supplies the demultiplexing unit 20b with the received continuous wave light. It is assumed that the power of the continuous wave light is represented as $EiN=E*e^{j\omega t}$. In the above equation, $\omega=2\pi F0$.

The demultiplexing unit 20b demultiplexes the continuous wave light received from the leading-in unit 20a, resulting in two parts of demultiplexed light. One part of the demultiplexed light is fed to the first phase changing unit 20c, and the other part of the demultiplexed light is fed to the second phase changing unit 20d. It should be noted that both the power of the one part of the demultiplexed light and the power of the other part of the demultiplexed light are $E/\sqrt{2}$ (it should be noted that $\sqrt{2}=2^{1/2}$).

The first phase changing unit 20c changes the phase of the one part of the demultiplexed light by a predetermined phase θ. Therefore, the power of the one part of the demultiplexed light becomes $(1/\sqrt{2})*E*e^{j\omega t}*e^{j\theta}$.

The second phase changing unit 20d changes the phase of the other part of the demultiplexed light by a predetermined phase −θ, which is in antiphase with, is thus the same in magnitude as, and is opposite in polarity to the predetermined phase. Therefore, the power of the other part of the demultiplexed light is represented as $(1/\sqrt{2})*E*e^{j\omega t}*e^{-j\theta}$.

The multiplexing unit 20e multiplexes the light output by the first phase changing unit 20c and the light output by the second phase changing unit 20d with each other.

The leading-out unit 20f emits light output by the multiplexing unit 20e to the optical coupler 24.

The electrode unit 20g is located above the first phase changing unit 20c and the second phase changing unit 20d. The power reducing unit 22 impresses a voltage to the electrode unit 20g.

The AC power supply unit 22a impresses an AC voltage (angular frequency: $\Omega=2\pi Flo$) on the electrode unit 20g. The DC power supply unit 22b impresses a DC voltage on the electrode unit 20g.

When the voltages are impressed on the electrode unit 20g, the refractive indices of the first phase changing unit 20c and the second phase changing unit 20d change due to an electro-optic effect, and the phases of the one and the other parts of the demultiplexed light thus change. On this occasion, a phase change of the one part of the demultiplexed light due to the AC voltage is expressed as $\phi \sin \Omega t$, and a phase change of the one part of the demultiplexed light due to the DC voltage is expressed as $\phi 0$ (constant component). It should be noted that $\phi$ and $\phi 0$ are constants, and "t" denotes time. As a result, the predetermined phase θ is expressed as $\theta = \phi \sin \Omega t + \phi 0$. It should be noted that the magnitude of the DC voltage can be considered to correspond to $\phi 0$ (constant component).

Then, the power of the light output by the leading-out unit 20f is represented as:

$$E_{out} = (E/2)*e^{j\omega t}*(e^{j\theta}+e^{-j\theta})$$

Since $e^{j\theta}=e^{j\phi 0}\Sigma J_n(\phi)e^{jn\Omega t}=e^{j\phi 0}(\ldots +J_1(\phi)e^{-j\Omega t}+J_0(\phi)+J_1(\phi)e^{j\Omega t}+\ldots)$ where Jn is a Bessel coefficient, $$E_{out}=E*e^{j\omega t}*((-jJ_1(\phi)\sin\phi 0)e^{-j\Omega t}+J_0(\phi)\cos\phi 0+(jJ_1(\phi)\sin\phi 0)e^{j\Omega t}).$$

The power of the component having the optical frequency F0 (optical angular frequency ω) is $J_0(\phi)\cos\phi 0$, and the power of the component having the optical frequency F0±Flo (optical angular frequency ω±Ω) is $J_1(\phi)\sin\phi 0$.

Figure 3:
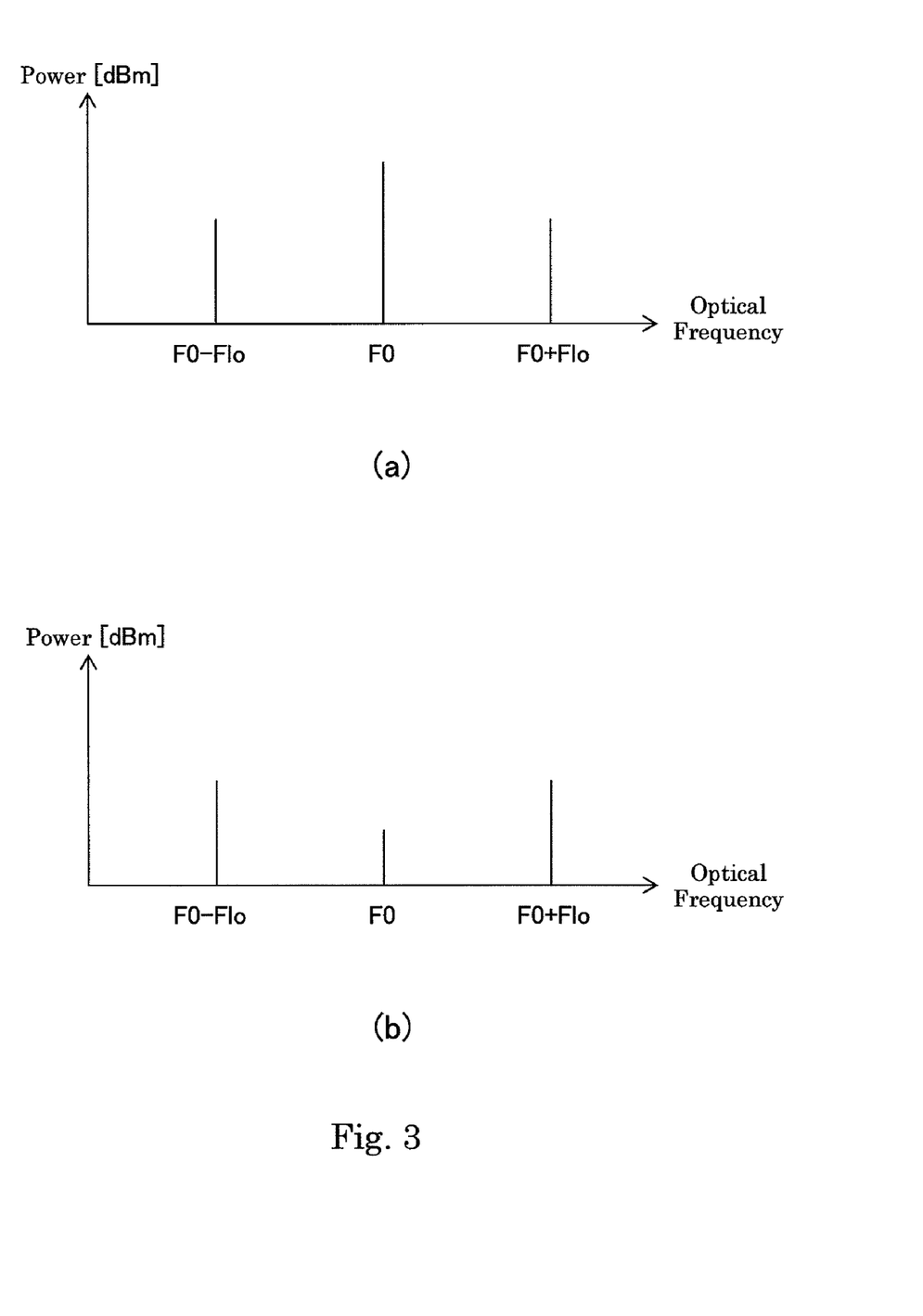
FIG. 3(a) shows a relationship between the optical frequencies and the powers of the light output by a leading-out unit 20f when the DC voltage impressed by a DC power supply unit 22b is low.
FIG. 3(b) shows a relationship between the optical frequencies and the powers of the light output by the leading-out unit 20f when the DC voltage impressed by the DC power supply unit 22b is high.

FIG. 3(a) shows a relationship between the optical frequencies and the powers of the light output by the leading-out unit 20f when the DC voltage impressed by the DC power supply unit 22b is low, and FIG. 3(b) shows a relationship between the optical frequencies and the powers of the light output by the leading-out unit 20f when the DC voltage impressed by the DC power supply unit 22b is high.

If the DC voltage impressed by the DC power supply unit 22b is low, and $\phi 0$ is thus approximately 0, the power of the component at the optical frequency F0 is high, and the powers of the components at the optical frequencies F0±Flo are low as shown in FIG. 3(a).

If the DC voltage impressed by the DC power supply unit 22b is high, and $\phi 0$ is thus close to 90 degree, the power of the component at the optical frequency F0 is low and the powers of the components at the optical frequencies F0±Flo are high as shown in FIG. 3(b).

In this way, the power reducing unit 22 increases the DC voltage impressed by the DC power supply unit 22b (causes the $\phi 0$ to be close to 90 degrees), thereby reducing the power of the continuous wave light (optical frequency: F0) in the shifted light output by the optical frequency shifter 20 to be lower than that when $\phi 0$ is approximately 0.

The optical coupler 24 receives the shifted light from the optical frequency shifter 20, further receives the scattered light from the optical coupler 18, multiplexes them, and supplies the heterodyne optical receiver 26 with the multiplexed light.

The heterodyne optical receiver 26 receives the light multiplexed by the optical coupler 24. In other words, the heterodyne optical receiver 26 receives the scattered light from the incident end 2a of the optical fiber 2, which the pulsed light enters, via the optical coupler 24. Further, the heterodyne optical receiver 26 receives the shifted light from the optical frequency shifter 20 via the optical coupler 24. Then, the heterodyne optical receiver 26 outputs an electric signal having a frequency which is a difference between the optical frequency of the scattered light and the optical frequency of the shifted light.

Figure 4:
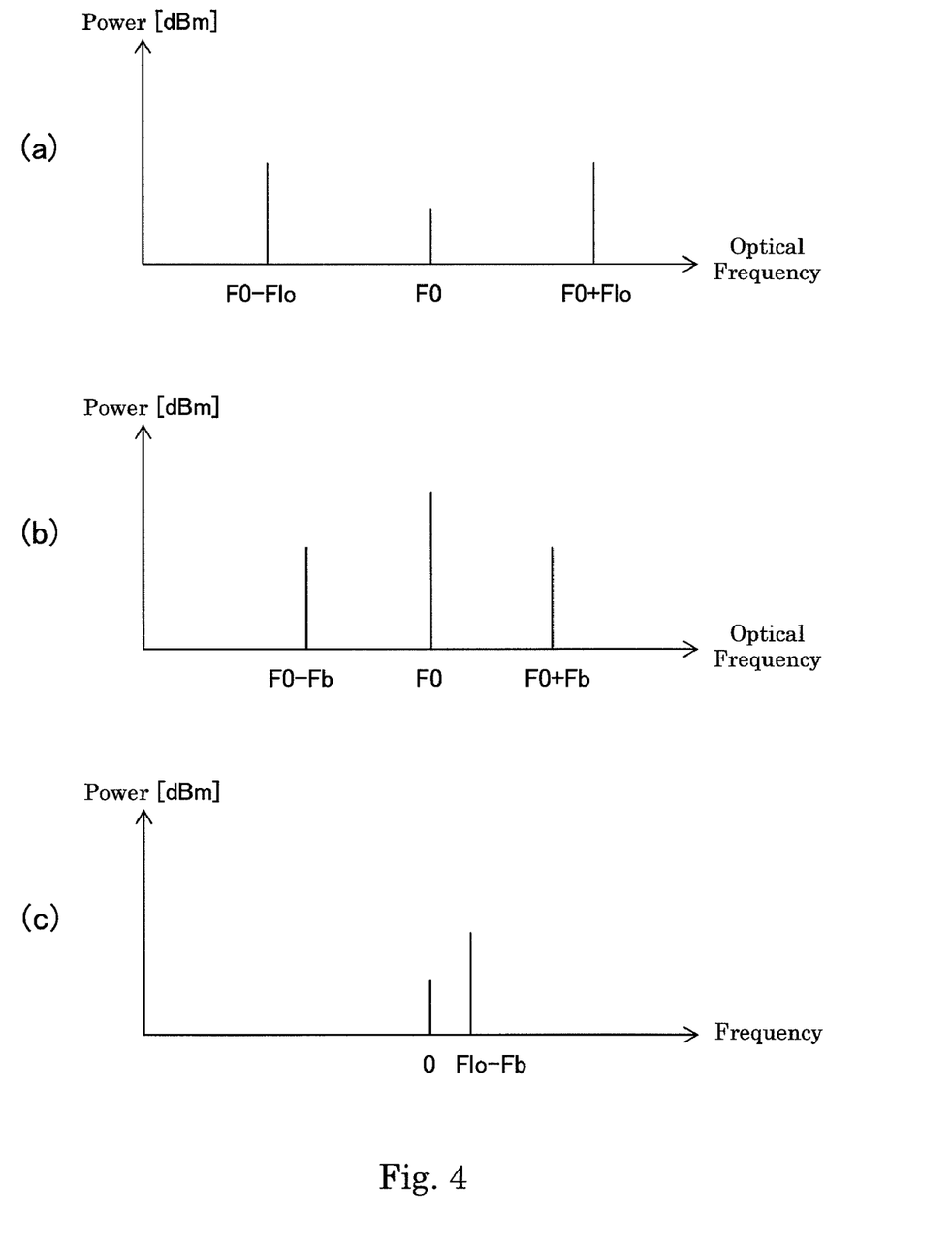
FIG. 4(a) shows a relationship between the optical frequencies and the powers of the output of the optical frequency shifter 20.
FIG. 4(b) shows a relationship between the optical frequencies and the powers of the scattered light.
FIG. 4(c) shows a relationship between the frequencies and the powers of the electric signal output from a heterodyne optical receiver 26.

FIG. 4(a) shows a relationship between the optical frequencies and the powers of the output of the optical frequency shifter 20, FIG. 4(b) shows a relationship between the optical frequencies and the powers of the scattered light, and FIG. 4(c) shows a relationship between the frequencies and the powers of the electric signal output from the heterodyne optical receiver 26.

FIG. 4(a) is similar to FIG. 3(b). With reference to FIG. 4(a), the power of the component having the optical frequency F0 is smaller than those of the components having the optical frequencies F0±Flo in the output of the optical frequency shifter 20.

With reference to FIG. 4(b), the scattered light includes the Rayleigh scattered light and the Brillouin scattered light. The optical frequency of the Rayleigh scattered light is F0, which is the same as the optical frequency of the pulsed light made incident to the optical fiber 2. Moreover, the optical frequencies of the Brillouin scattered light are F0±Fb, which are deviated from the optical frequency F0 of the pulsed light made incident to the optical fiber 2 by a predetermined optical frequency Fb. The power of the Rayleigh scattered light is larger than the powers of the Brillouin scattered light. Though the optical frequency of the scattered light actually spreads to a certain extent, the spreads are not shown in FIG. 4(b) for the sake of illustration.

With reference to FIG. 4(c), the electric signal output by the heterodyne receiver 26 includes a component having a frequency 0, which is a difference between the optical frequency F0 of the Rayleigh scattered light and the optical frequency F0 of the continuous wave light component of the shifted light. Moreover, the electric signal output by the heterodyne optical receiver 26 includes a component having a frequency Flo−Fb, which is a difference between the optical frequency F0+Fb of the Brillouin scattered light and the optical frequency F0+Flo of the first sideband light component of the shifted light.

Components having a frequency higher than Flo−Fb such as a component having the frequency Flo which is a difference between the optical frequency F0 of the Rayleigh scattered light and the optical frequency F0+Flo of the first sideband light component of the shifted light, and a component having the frequency Flo+Fb which is a difference between the optical frequency F0−Fb of the Brillouin scattered light and the optical frequency F0+Flo of the first sideband light component of the shifted light are too high to detect by the heterodyne optical receiver 26, and are thus not shown in FIG. 4(c).

The filter circuit 30 passes an electric signal output from the heterodyne optical receiver 26 in a band close to the frequency Flo−Fb, and does not pass a signal in the other band. In this way, an electric signal corresponding to the Brillouin scattered light is obtained.

The signal processing circuit 32 receives the output of the filter circuit 30, and derives the power of the Brillouin scattered light and the like.

A description will now be given of an operation of the first embodiment.

First, the continuous wave light source 10 generates the continuous wave light.

The continuous wave light is fed to the optical pulse generator 14 via the optical coupler 12. The optical pulse generator 14 converts the continuous wave light into the pulsed light. The pulsed light is amplified by the optical amplifier 16, passes the photo coupler 18, and is made incident to the incident end 2a of the optical fiber 2.

The scattered light (Rayleigh scattered light and Brillouin scattered light) is emitted from the incident end 2a of the optical fiber 2, and is fed to the optical coupler 18. The optical coupler 18 supplies the optical coupler 24 with the received scattered light.

Moreover, the continuous wave light is fed to the optical frequency shifter 20 via the optical coupler 12. The optical frequency shifter 20 receives the continuous wave light (optical frequency: F0), and outputs the shifted light (continuous wave light (optical frequency: F0)), the first sideband light (optical frequency: F0+Flo), and the second sideband light (optical frequency: F0−Flo). Since the DC voltage is impressed by the DC power supply unit 22b in the power reducing unit 22 so that φ0 is close to 90 degrees, the power of the continuous wave light component in the shifted light is reduced, and is thus lower than the power of the component of the first sideband light and the power of the component of the second sideband light. For example, the power of the continuous wave light component in the shifted light is reduced to be lower than the powers of the component of the first sideband light and the component of the second sideband light by 20 dB. The shifted light output from the optical frequency shifter 20 is fed to the optical coupler 24.

The optical coupler 24 receives the shifted light from the optical frequency shifter 20, receives the scattered light from the optical coupler 18, multiplexes them, and supplies the heterodyne optical receiver 26 with the multiplexed light.

The heterodyne optical receiver 26 outputs the electric signal including the component having the frequency 0, which is the difference between the optical frequency F0 of the Rayleigh scattered light and the optical frequency F0 of the continuous wave light component of the shifted light, and the component having the frequency Flo−Fb, which is the difference between the optical frequency F0+Fb of the Brillouin scattered light and the optical frequency F0+Flo of the first sideband light component of the shifted light. The components having a frequency higher than the frequency Flo−Fb cannot be output by the heterodyne optical receiver 26.

FIG. 5(a) shows a relationship between the frequencies and the powers of the electric signal output by the heterodyne optical receiver 26 when the DC voltage impressed by the DC power supply unit 22b is low, and FIG. 5(b) shows a relationship between the frequencies and the powers of the electric signal output by the heterodyne optical receiver 26 when the DC voltage impressed by the DC power supply unit 22b is high.

With reference to FIG. 5(a), when the DC voltage impressed by the DC power supply unit 22b is low, the power of the Rayleigh scattered light and the power of the continuous wave light component of the shifted light at the optical frequency F0 are also high. Thus, the power of the component of the Rayleigh scattered light of the electric signal output by the heterodyne optical receiver 26 is also high. Therefore, if the frequency Flo−Fb is not sufficiently separated from the frequency 0, the component of the Brillouin scattered light of the electric signal output by the heterodyne optical receiver 26 is buried in the component of the Rayleigh scattered light.

On the other hand, with reference to FIG. 5(b), when the DC voltage impressed by the DC power supply unit 22b is high, though the power of the Rayleigh scattered light is high, the power of the continuous wave light component of the shifted light at the optical frequency F0 is low. Thus, the power of the component of the Rayleigh scattered light of the electric signal output by the heterodyne optical receiver 26 is low. Therefore, even if the frequency Flo−Fb is not largely separated from the frequency 0 (the frequency Flo−Fb is lower in FIG. 5(b) than in FIG. 5(a)), it is possible to prevent the component of the Brillouin scattered light of the electric signal output by the heterodyne optical receiver 26 from being buried in the component of the Rayleigh scattered light.

The filter circuit 30 passes the electric signal output from the heterodyne optical receiver 26 in the band close to the frequency Flo−Fb, and does not pass the signal in the other band. The signal processing circuit 32 receives the output of the filter circuit 30, and derives the power of the Brillouin scattered light and the like.

According to the first embodiment, since the DC voltage impressed by the DC power supply unit 22b is increased so that φ0 is close to 90 degrees, even if the frequency Flo−Fb is low, it is possible to measure the power of the Brillouin scattered light and the like. Therefore, it is possible to measure the Brillouin scattered light without the heterodyne optical receiver 26 with a wide reception band.

Moreover, the power of the continuous wave light component in the shifted light can be reduced by the optical frequency shifter 20. The optical frequency shifter 20 is an optical intensity modulator, and can thus carry out the reduction of the power of the continuous wave light component in the shifted light by the optical intensity modulation without employing the phase modulation.

Second Embodiment

Figure 6:
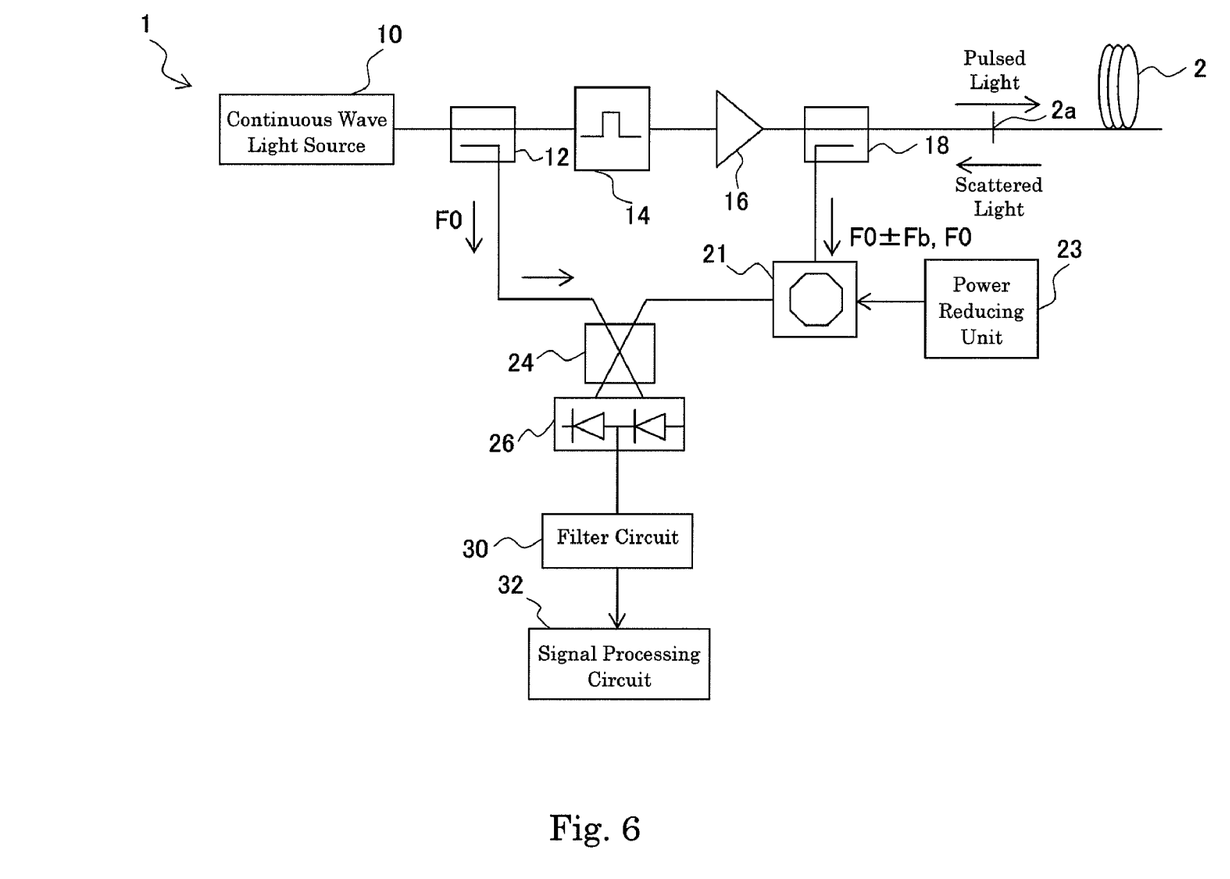
FIG. 6 shows a configuration of a Brillouin scattered light measuring device 1 according a second embodiment

A second embodiment includes an optical frequency shifter 21 and a power reducing unit 23 in place of the optical frequency shifter 20 and the power reducing unit 22 in the first embodiment.

FIG. 6 shows a configuration of the Brillouin scattered light measuring device 1 according the second embodiment. The Brillouin scattered light measuring device 1 is connected to the optical fiber 2. Moreover, the Brillouin scattered light measuring device 1 includes the continuous wave light source 10, the optical coupler 12, the optical pulse generator 14, the optical amplifier 16, the optical coupler 18, the optical frequency shifter 21, the power reducing unit 23, the optical coupler 24, the heterodyne optical receiver 26, the filter circuit 30, and the signal processing circuit 32. In the following section, like components are denoted by like numerals as of the first embodiment, and will be explained in no more details.

The continuous wave light source 10, the optical pulse generator 14, the optical amplifier 16, the optical coupler 18, the filter circuit 30, and the signal processing circuit 32 are the same as those of the first embodiment, and hence a description thereof is omitted.

The optical coupler 12 receives the continuous wave light from the continuous wave light source 10, and supplies the optical pulse generator 14 and the optical coupler 24 with the continuous wave light.

The optical frequency shifter 21 receives the scattered light from the incident end 2a of the optical fiber 2, which the pulsed light enters. Then, the optical frequency shifter 21 outputs shifted light. It should be noted that the shifted light includes the scattered light (optical frequencies: F0, F0±Fb), first sideband scattered light, and second sideband scattered light. The first sideband scattered light has optical frequencies F0+Flo and F0+Flo±Fb, which are higher than the optical frequency F0 of the scattered light by the predetermined optical frequency Flo. The second sideband scattered light has optical frequencies F0−Flo and F0−Flo±Fb, which are lower than the optical frequency F0 of the scattered light by the predetermined optical frequency Flo.

Figure 2:
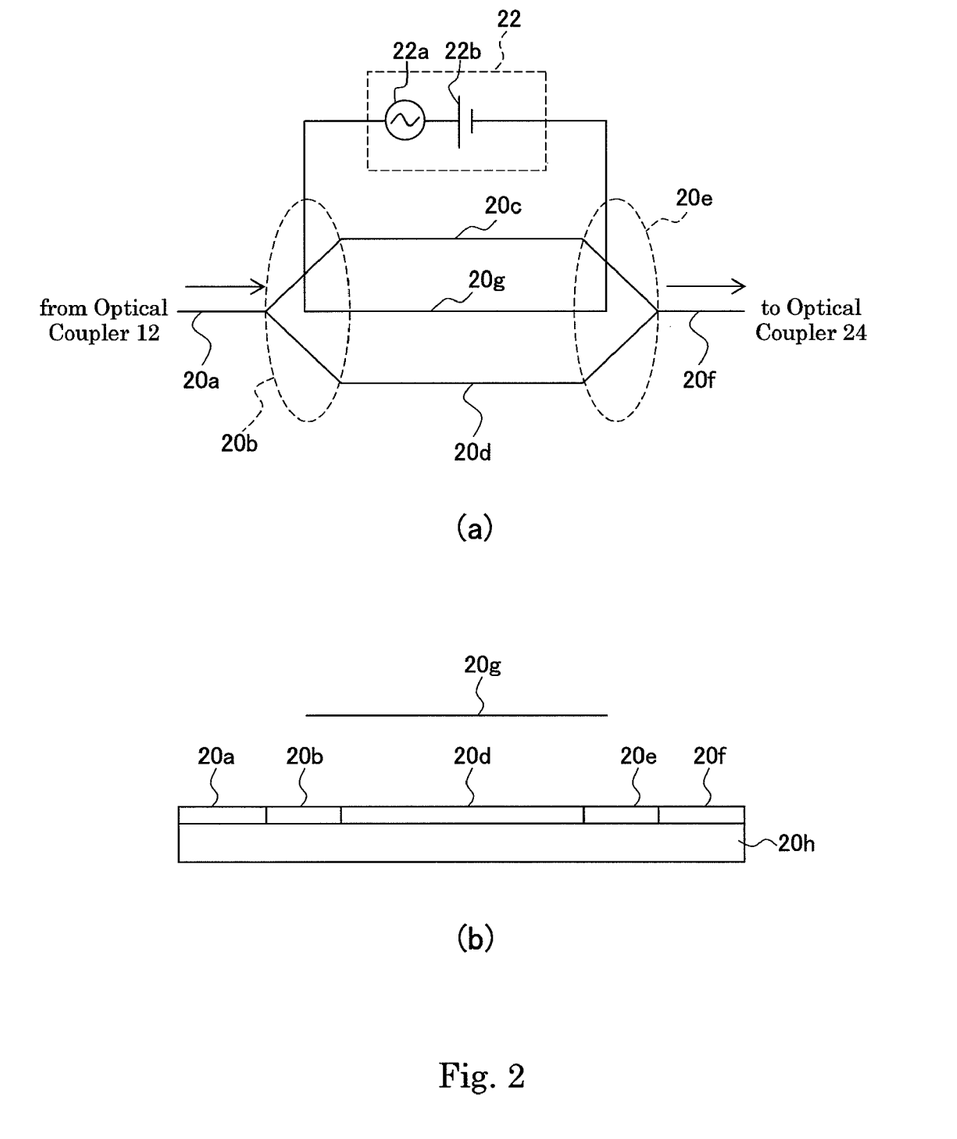
FIG. 2(a) and FIG. 2(b) are respectively a plan view and a front view of an optical frequency shifter 20.

It should be noted that a configuration of the optical frequency shifter 21 is the same as that of the first embodiment (refer to FIG. 2). However, the optical frequency shifter 21 receives the light from the optical coupler 18.

The power reducing unit 23 reduces the power of the scattered light in the shifted light output by the optical frequency shifter 21.

The optical coupler 24 receives the shifted light from the optical frequency shifter 21, further receives the continuous wave light from the optical coupler 12, multiplexes them, and supplies the heterodyne optical receiver 26 with the multiplexed light.

The heterodyne optical receiver 26 receives the light multiplexed by the optical coupler 24. In other words, the heterodyne optical receiver 26 receives the continuous wave light from the continuous wave light source 10 via the optical coupler 24. Further, the heterodyne optical receiver 26 receives the shifted light from the optical frequency shifter 20 via the optical coupler 24. Then, the heterodyne optical receiver 26 outputs an electric signal having a frequency which is a difference between the optical frequency of the continuous wave light and the optical frequency of the shifted light.

FIGS. 7(a) to 7(f) are to describe the electric signal output by the heterodyne optical receiver 26. FIG. 7(a) shows a relationship between the optical frequencies and the powers of the scattered light. With reference to FIG. 7(a), the scattered light includes the Rayleigh scattered light and the Brillouin scattered light. The optical frequency of the Rayleigh scattered light is F0, which is the same as the optical frequency of the pulsed light made incident to the optical fiber 2. Moreover, the optical frequencies of the Brillouin scattered light are F0±Fb, which are deviated from the optical frequency F0 of the pulsed light made incident to the optical fiber 2 by the predetermined optical frequency Fb. The power of the Rayleigh scattered light is larger than the powers of the Brillouin scattered light. Though the optical frequency of the scattered light actually spreads to a certain extent, the spreads are not shown in FIGS. 7(a) to 7(f) for the sake of illustration.

FIG. 7(b) shows a relationship between the optical frequencies and the powers of the components of the scattered light in the shifted light output by the optical frequency shifter 21. The power is reduced by the power reducing unit 23 compared with that in FIG. 7(a).

FIG. 7(c) shows a relationship between the optical frequencies F0+Flo and F0+Flo±Fb and the powers of the components of the first sideband scattered light in the shifted light output by the optical frequency shifter 21. The powers of the first sideband scattered light are larger than the powers of the scattered light.

FIG. 7(d) shows a relationship between the optical frequencies F0−Flo and F0−Flo±Fb and the powers of the components of the second sideband scattered light in the shifted light output by the optical frequency shifter 21. The powers of the second sideband scattered light are larger than the powers of the scattered light.

FIG. 7(e) shows a relationship between the optical frequency F0 and the power of the continuous wave light fed to the heterodyne optical receiver 26 from the continuous wave light source 10 via the optical coupler 12 and the optical coupler 24.

Figure 7:
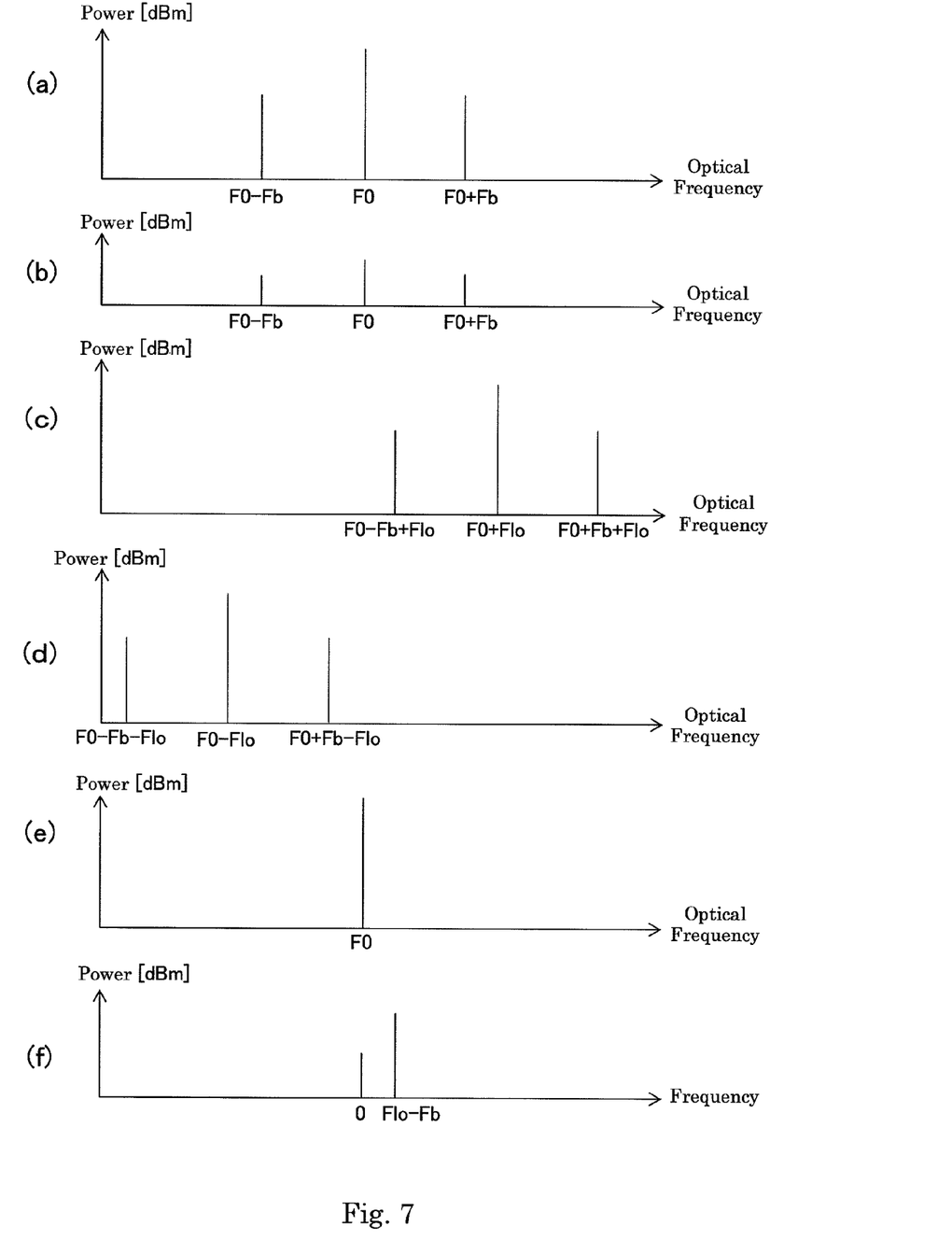
FIG. 7(a) to 7(f) are to describe the electric signal output by the heterodyne optical receiver 26.

FIG. 7(f) shows a relationship between the frequencies and the powers of the electrical signal output by the heterodyne optical receiver 26. With reference to FIG. 7(f), the electric signal output by the heterodyne optical receiver 26 outputs an electric signal having the frequency 0, which is the difference between the optical frequency F0 (refer to FIG. 7(e)) of the continuous wave light and the optical frequency F0 (refer to FIG. 7(b)) of the component corresponding to the Rayleigh scattered light in the scattered light component of the shifted light. Moreover, the electric signal output by the heterodyne optical receiver 26 includes a component having the frequency Flo−Fb, which is a difference between the optical frequency F0 (refer to FIG. 7(e)) of the continuous wave light and the optical frequency F0+Flo−Fb (refer to FIG. 7(c)) of the component corresponding to the Brillouin scattered light in the first sideband scattered light component of the shifted light. It should be noted that components having a frequency higher than Flo−Fb cannot be detected by the heterodyne optical receiver 26, and are thus not shown in FIG. 7(*f*).

A description will now be given of an operation of the second embodiment.

First, the continuous wave light source 10 generates the continuous wave light.

The continuous wave light is fed to the optical pulse generator 14 via the optical coupler 12. The optical pulse generator 14 converts the continuous wave light into pulsed light. The pulsed light is amplified by the optical amplifier 16, passes the photo coupler 18, and is made incident to the incident end 2*a* of the optical fiber 2.

The scattered light (Rayleigh scattered light and Brillouin scattered light) is emitted from the incident end 2*a* of the optical fiber 2, and is fed to the optical coupler 18. The optical coupler 18 supplies the optical frequency shifter 21 with the received scattered light.

The optical frequency shifter 21 receives the scattered light (optical frequencies: F0, F0±Fb) and outputs the shifted light (the scattered light (optical frequencies: F0, F0±Fb), the first sideband scattered light (optical frequencies: F0+Flo, F0+Flo±Fb), and the second sideband scattered light (optical frequencies: F0−Flo, F0−Flo±Fb)). Since the DC voltage is impressed by the DC power supply unit 22*b* in the power reducing unit 23 so that $\phi 0$ is close to 90 degrees, the power of the scattered light component in the shifted light is reduced, and is thus lower than the power of the component of the first sideband scattered light and the power of the component of the second sideband scattered light. For example, the power of the scattered light component in the shifted light is reduced to be lower than the powers of the component of the first sideband scattered light and the component of the second sideband scattered light by 20 dB. The shifted light output from the optical frequency shifter 21 is fed to the optical coupler 24.

Moreover, the continuous wave light is fed to the optical coupler 24 via the optical coupler 12.

The optical coupler 24 receives the shifted light from the optical frequency shifter 20, further receives the continuous wave light from the optical coupler 12, multiplexes them, and supplies the heterodyne optical receiver 26 with the multiplexed light.

The heterodyne optical receiver 26 outputs an electric signal including the component having the frequency 0, which is the difference between the optical frequency F0 (refer to FIG. 7(*e*)) of the continuous wave light and the optical frequency F0 (refer to FIG. 7(*b*)) of the component corresponding to the Rayleigh scattered light in the scattered light component of the shifted light, and the component having the frequency Flo−Fb, which is the difference between the optical frequency F0 (refer to FIG. 7(*e*)) of the continuous wave light and the optical frequency F0+Flo−Fb (refer to FIG. 7(*c*)) of the component corresponding to the Brillouin scattered light in the first sideband scattered light component of the shifted light. The components higher than the frequency Flo−Fb cannot be output by the heterodyne optical receiver 26.

Figure 5:
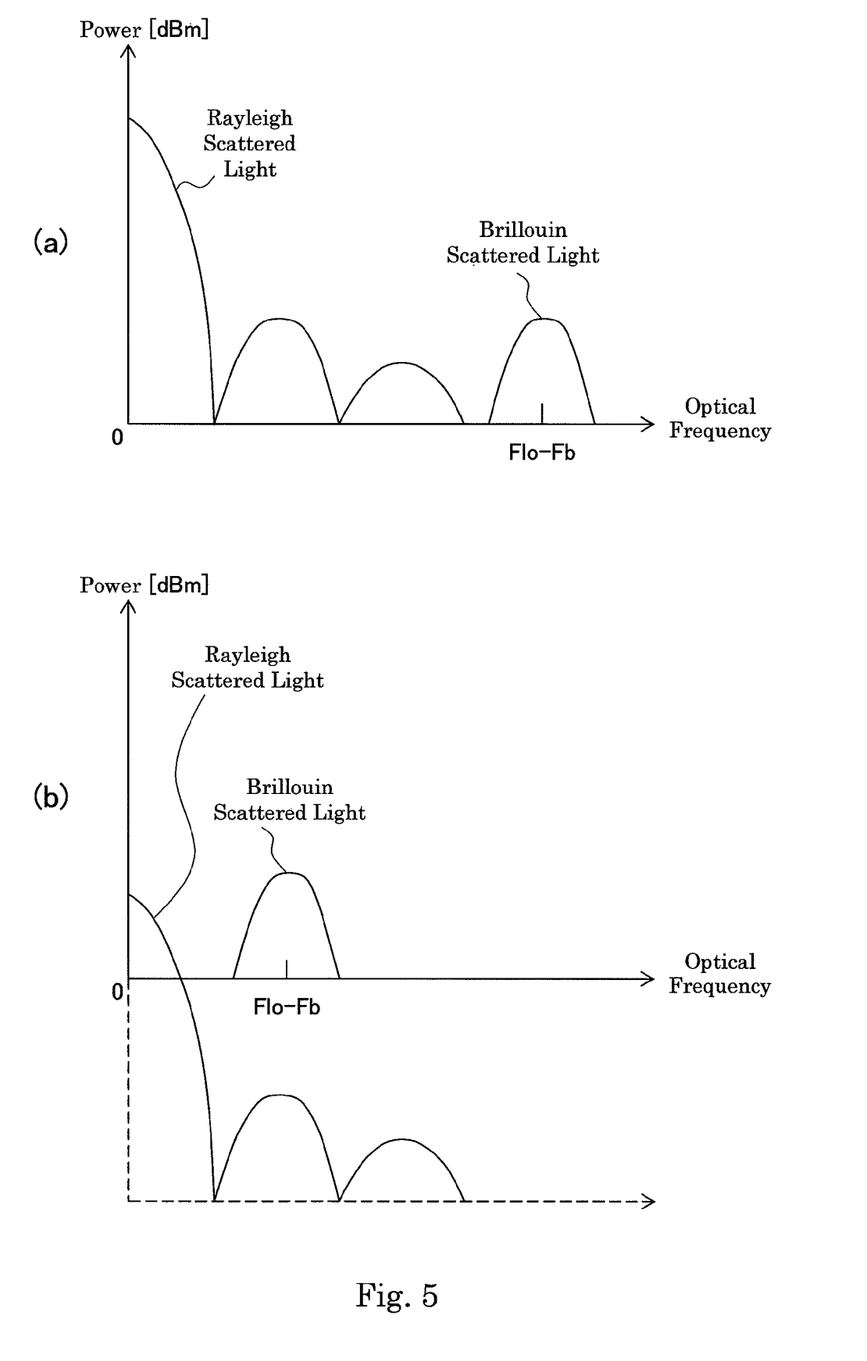
FIG. 5(a) shows a relationship between the frequencies and the powers of the electric signal output by the heterodyne optical receiver 26 when the DC voltage impressed by the DC power supply unit 22b is low.
FIG. 5(b) shows a relationship between the frequencies and the powers of the electric signal output by the heterodyne optical receiver 26 when the DC voltage impressed by the DC power supply unit 22b is high.

The power of the component of the frequency 0 of the electric signal output by the heterodyne optical receiver 26 is small as the first embodiment, and the frequency Flo−Fb can be low (refer to FIG. 5).

The filter circuit 30 passes an electric signal output from the heterodyne optical receiver 26 in a band close to the frequency Flo−Fb, and does not pass a signal in the other band. The signal processing circuit 32 receives the output of the filter circuit 30, and derives the power of the Brillouin scattered light and the like.

According to the second embodiment, there are obtained the same effects as in the first embodiment.

Third Embodiment

Figure 8:
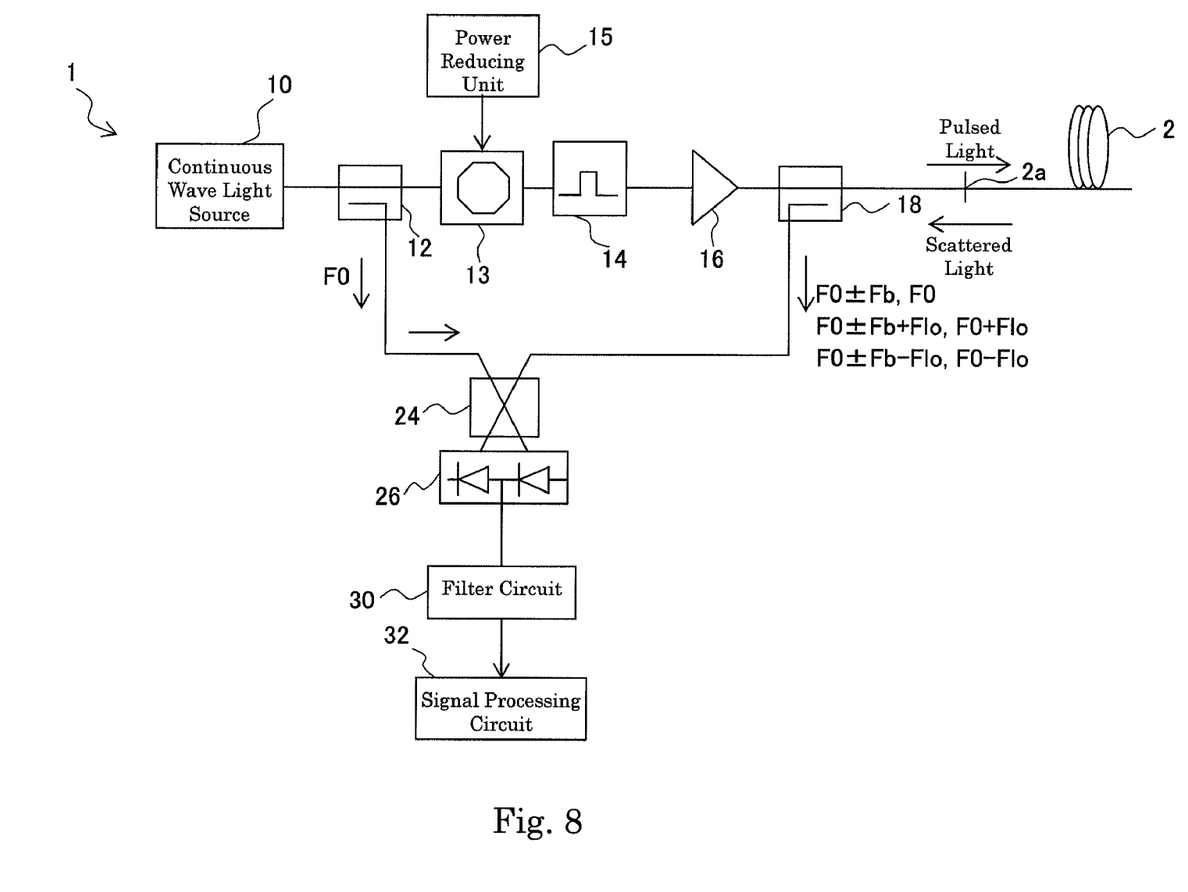
FIG. 8 shows a configuration of a Brillouin scattered light measuring device 1 according a third embodiment.

A third embodiment includes an optical frequency shifter 13 and a power reducing unit 15 in place of the optical frequency shifter 20 and the power reducing unit 22 in the first embodiment.

FIG. 8 shows a configuration of the Brillouin scattered light measuring device 1 according to the third embodiment. The Brillouin scattered light measuring device 1 is connected to the optical fiber 2. Moreover, the Brillouin scattered light measuring device 1 includes the continuous wave light source 10, the optical coupler 12, the optical frequency shifter 13, the optical pulse generator 14, the power reducing unit 15, the optical amplifier 16, the optical coupler 18, the optical coupler 24, the heterodyne optical receiver 26, the filter circuit 30, and the signal processing circuit 32. In the following section, like components are denoted by like numerals as of the first embodiment, and will be explained in no more details.

The continuous wave light source 10, the optical amplifier 16, the optical coupler 18, the filter circuit 30, and the signal processing circuit 32 are the same as those of the first embodiment, and hence a description thereof is omitted.

The optical coupler 12 receives the continuous wave light from the continuous wave light source 10, and supplies the optical frequency shifter 13 and the optical coupler 24 with the continuous wave light.

The optical frequency shifter 13 receives the continuous wave light from the optical coupler 12. Then, the optical frequency shifter 13 outputs shifted light. It should be noted that the shifted light includes the continuous wave light, the first side band light, and the second side band light. The first side band light is light having the optical frequency F0+Flo, which is higher than the optical frequency F0 of the continuous wave light by the optical frequency of Flo. The second side band light is light having the optical frequency F0−Flo, which is lower than the optical frequency F0 of the continuous wave light by the optical frequency of Flo.

It should be noted that a configuration of the optical frequency shifter 13 is the same as that of the first embodiment (refer to FIG. 2). However, the optical frequency shifter 13 outputs the light to the optical pulse generator 14.

The power reducing unit 15 reduces the power of the continuous wave light (optical frequency: F0) in the shifted light output by the optical frequency shifter 13.

The optical pulse generator 14 converts the shifted light into pulsed light.

The optical coupler 24 receives the scattered light from the optical coupler 18, further receives the continuous wave light from the optical coupler 12, multiplexes them, and supplies the heterodyne optical receiver 26 with the multiplexed light.

The heterodyne optical receiver 26 receives the light multiplexed by the optical coupler 24. In other words, the heterodyne optical receiver 26 receives the continuous wave light from the continuous wave light source 10 via the optical coupler 24. Further, the heterodyne optical receiver 26 receives the scattered light from the optical coupler 18 via the optical coupler 24. Then, the heterodyne optical receiver 26 outputs an electric signal having a frequency which is a difference between the optical frequency of the continuous wave light and the optical frequency of the scattered light.

Figure 9:
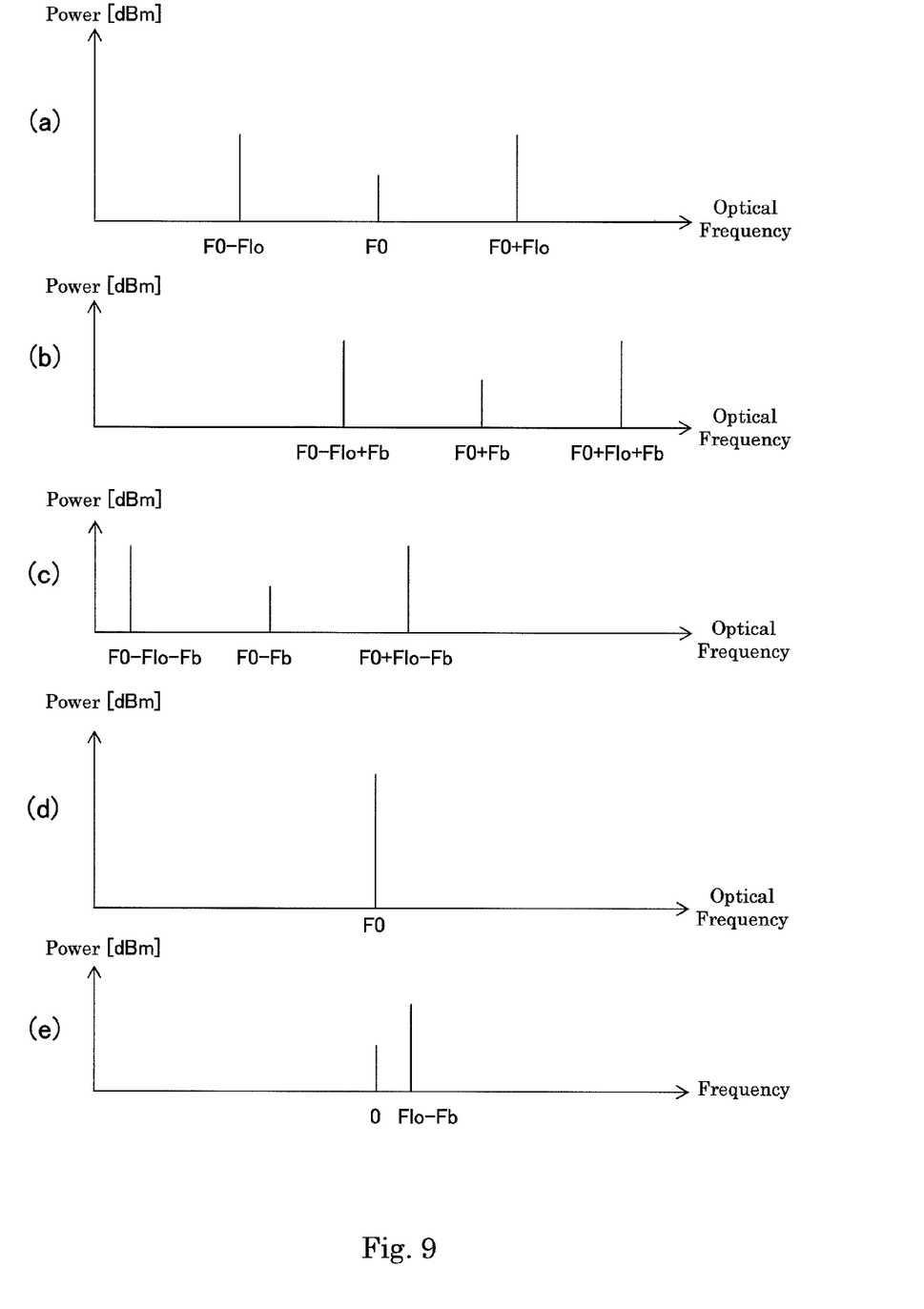
FIGS. 9(a) to 9(e) are to describe the electric signal output by the heterodyne optical receiver 26.

FIGS. 9(*a*) to 9(*e*) are to describe the electric signal output by the heterodyne optical receiver 26. FIG. 9(*a*) is similar to FIG. 3(*b*). With reference to FIG. 9(*a*), the power of the component having the optical frequency F0 is smaller than those of the components having the optical frequencies F0±Flo in the output of the optical frequency shifter 13. It should be noted that the optical frequencies and the powers of the Rayleigh scattered light in the scattered light fed from the optical coupler 18 to the optical coupler 24 can be represented as in FIG. 9(a). Though the optical frequency of the scattered light actually spreads to a certain extent, the spreads are not shown in FIGS. 9(a) to 9(e) for the sake of illustration.

FIG. 9(b) shows a relationship between the optical frequencies and the powers of a component (component of having the optical frequencies increased by Fb) of the Brillouin scattered light in the scattered light fed from the optical coupler 18 to the optical coupler 24.

FIG. 9(c) shows a relationship between the optical frequencies and the powers of a component (component of having the optical frequencies decreased by Fb) of the Brillouin scattered light in the scattered light fed from the optical coupler 18 to the optical coupler 24.

FIG. 9(d) shows the optical frequency F0 and the power of the continuous wave light fed to the heterodyne optical receiver 26 from the continuous wave light source 10 via the optical coupler 12 and the optical coupler 24.

FIG. 9(e) shows a relationship between the frequencies and the powers of the electrical signal output by the heterodyne optical receiver 26. With reference to FIG. 9(e), the electric signal output by the heterodyne optical receiver 26 outputs an electric signal having the frequency 0, which is the difference between the optical frequency F0 (refer to FIG. 9(d)) of the continuous wave light and the optical frequency F0 (refer to FIG. 9(a)) of the component corresponding to the Rayleigh scattered light in the scattered light. Moreover, the electric signal output by the heterodyne optical receiver 26 includes a component having the frequency Flo−Fb, which is the difference between the optical frequency F0 (refer to FIG. 9(d)) of the continuous wave light and the optical frequency F0+Flo−Fb (refer to FIG. 9(c)) of the Brillouin scattered light in the scattered light. It should be noted that the components having a frequency higher than Flo−Fb cannot be detected by the heterodyne optical receiver 26, and are thus not shown in FIG. 9(e).

A description will now be given of an operation of the third embodiment.

First, the continuous wave light source 10 generates the continuous wave light.

The continuous wave light is fed to the optical frequency shifter 13 via the optical coupler 12. The optical frequency shifter 13 receives the continuous wave light (optical frequency: F0), and outputs the shifted light (continuous wave light (optical frequency: F0)), the first side band light (optical frequency: F0+Flo), and the second side band light (optical frequency: F0−Flo). Since the DC voltage is impressed by the DC power supply unit 22b in the power reducing unit 15 so that φ0 is close to 90 degrees, the power of the continuous light component in the shifted light is reduced, and is thus lower than the power of the component of the first sideband light and the power of the component of the second sideband light. For example, the power of the continuous wave light component in the shifted light is reduced to be lower than the powers of the component of the first sideband light and the component of the second sideband light by 20 dB. The shifted light output from the optical frequency shifter 13 is fed to the optical pulse generator 14. The optical pulse generator 14 converts the shifted light into pulsed light. The pulsed light is amplified by the optical amplifier 16, passes the photo coupler 18, and is made incident to the incident end 2a of the optical fiber 2.

The scattered light (Rayleigh scattered light and Brillouin scattered light) is emitted from the incident end 2a of the optical fiber 2, and is supplied to the optical coupler 18. The optical coupler 18 supplies the optical coupler 24 with the received scattered light.

Moreover, the continuous wave light is supplied to the optical coupler 24 via the optical coupler 12.

The optical coupler 24 receives the scattered light from the optical coupler 18, further receives the continuous wave light from the optical coupler 12, multiplexes them, and supplies the heterodyne optical receiver 26 with the multiplexed light.

The heterodyne optical receiver 26 outputs an electric signal including the component having the frequency 0, which is the difference between the optical frequency F0 (refer to FIG. 9(d)) of the continuous wave light and the optical frequency F0 (refer to FIG. 9(a)) of the Rayleigh scattered light in the scattered light, and the component having the frequency Flo−Fb, which is the difference between the optical frequency F0 (refer to FIG. 9(d)) of the continuous wave light and the optical frequency F0+Flo−Fb (refer to FIG. 9(c)) of the Brillouin scattered light in the scattered light. The components higher than the frequency Flo−Fb cannot be output by the heterodyne optical receiver 26.

The power of the component of the frequency 0 of the electric signal output by the heterodyne optical receiver 26 is small as the first embodiment, and the frequency Flo−Fb can be low (refer to FIG. 5).

The filter circuit 30 passes an electric signal output from the heterodyne optical receiver 26 in a band close to the frequency Flo−Fb, and does not pass a signal in the other band. The signal processing circuit 32 receives the output of the filter circuit 30, and derives the power of the Brillouin scattered light and the like.

According to the third embodiment, there are obtained the same effects as in the first embodiment.

The invention claimed is:

1. A scattered light measuring device comprising:
a continuous wave light source that generates continuous wave light;
an optical pulse generator that converts the continuous wave light into pulsed light;
an optical frequency shifter that receives the continuous wave light, and outputs a shifted light including the continuous wave light, first sideband light having an optical frequency higher than an optical frequency of the continuous wave light by a predetermined optical frequency, and second sideband light having an optical frequency lower than the optical frequency of the continuous wave light by the predetermined optical frequency;
a power reducer that reduces the power of the continuous wave light in the shifted light output by said optical frequency shifter; and
a heterodyne optical receiver that receives scattered light from an incident end of an optical fiber which the pulsed light enters, further receives the shifted light from said optical frequency shifter, and outputs an electric signal having a frequency which is a difference between the optical frequency of the scattered light and the optical frequency of the shifted light.

2. The scattered light measuring device according to claim 1, wherein said optical frequency shifter comprises demultiplexer that demultiplexes the received light into two parts of demultiplexed light, a first phase changer that changes the phase of one part of the demultiplexed light by a predetermined phase, a second phase changer that changes the phase of the other part of the demultiplexed light by a predetermined phase, which is in antiphase with, is thus the same in magnitude as, and is opposite in polarity to the predetermined phase, and a multiplexer that multiplexes an output of said first phase changer and an output of said second phase changer with each other, wherein said power reducer causes the predetermined phase to have a constant component.

3. The scattered light measuring device according to claim 2, wherein said power reducer impresses a DC voltage the magnitude of which corresponds to the constant component.

4. A scattered light measuring device comprising:
   a continuous wave light source that generates continuous wave light;
   an optical pulse generator that converts the continuous wave light into pulsed light;
   an optical frequency shifter that receives scattered light from an incident end of an optical fiber which the pulsed light enters, and outputs shifted light including the scattered light, first sideband scattered light having an optical frequency higher than an optical frequency of the scattered light by a predetermined optical frequency, and second sideband scattered light having an optical frequency lower than the optical frequency of the scattered light by the predetermined optical frequency;
   a power reducer that reduces the power of the scattered light in the shifted light output by said optical frequency shifter; and
   a heterodyne optical receiver that receives continuous wave light from said continuous wave light source, further receives the shifted light from said optical frequency shifter, and outputs an electric signal having a frequency which is a difference between the optical frequency of the continuous wave light and the optical frequency of the shifted light.

5. The scattered light measuring device according to claim 4, wherein said optical frequency shifter comprises demultiplexer that demultiplexes the received light into two parts of demultiplexed light, a first phase changer that changes the phase of one part of the demultiplexed light by a predetermined phase, a second phase changer that changes the phase of the other part of the demultiplexed light by a predetermined phase, which is in antiphase with, is thus the same in magnitude as, and is opposite in polarity to the predetermined phase, and a multiplexer that multiplexes an output of said first phase changer and an output of said second phase changer with each other, wherein said power reducer causes the predetermined phase to have a constant component.

6. The scattered light measuring device according to claim 5, wherein said power reducer impresses a DC voltage the magnitude of which corresponds to the constant component.

7. A scattered light measuring device comprising:
   a continuous wave light source that generates continuous wave light;
   an optical frequency shifter that receives the continuous wave light, and outputs a shifted light including the continuous wave light, first sideband light having an optical frequency higher than an optical frequency of the continuous wave light by a predetermined optical frequency, and second sideband light having an optical frequency lower than the optical frequency of the continuous wave light by the predetermined optical frequency;
   a power reducer that reduces the power of the continuous wave light in the shifted light output by said optical frequency shifter;
   an optical pulse generator that converts the shifted light into pulsed light; and
   a heterodyne optical receiver that receives the continuous wave light from said continuous wave light source, further receives scattered light from an incident end of an optical fiber which the pulsed light enters, and outputs an electric signal having a frequency which is a difference between the optical frequency of the continuous wave light and the optical frequency of the shifted light.

8. The scattered light measuring device according to claim 7, wherein said optical frequency shifter comprises demultiplexer that demultiplexes the received light into two parts of demultiplexed light, a first phase changer that changes the phase of one part of the demultiplexed light by a predetermined phase, a second phase changer that changes the phase of the other part of the demultiplexed light by a predetermined phase, which is in antiphase with, is thus the same in magnitude as, and is opposite in polarity to the predetermined phase, and a multiplexer that multiplexes an output of said first phase changer and an output of said second phase changer with each other, wherein said power reducer causes the predetermined phase to have a constant component.

9. The scattered light measuring device according to claim 8, wherein said power reducer impresses a DC voltage the magnitude of which corresponds to the constant component.

* * * * *